United States Patent
Jain et al.

(10) Patent No.: US 9,720,888 B1
(45) Date of Patent: Aug. 1, 2017

(54) DISTRIBUTED BROWSING ARCHITECTURE FOR THE DELIVERY OF GRAPHICS COMMANDS TO USER DEVICES FOR ASSEMBLING A PLURALITY OF LAYERS OF A CONTENT PAGE

(71) Applicant: Amazon Technologies, Inc., Reno, NV (US)

(72) Inventors: Saral Jain, Bellevue, WA (US); David Andrew Killian, Seattle, WA (US); Sajeeva Lakmal Bandara Pallemulle, Woodinville, WA (US); Dmitry Sokolowski, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 64 days.

(21) Appl. No.: 14/285,504

(22) Filed: May 22, 2014

(51) Int. Cl.
G06F 17/00 (2006.01)
G06F 17/22 (2006.01)
G06F 17/30 (2006.01)
H04L 29/08 (2006.01)

(52) U.S. Cl.
CPC .... G06F 17/2247 (2013.01); G06F 17/30905 (2013.01); H04L 67/02 (2013.01); H04L 67/04 (2013.01); H04L 67/28 (2013.01)

(58) Field of Classification Search
CPC ........... G06F 17/30905; G06F 17/2247; H04L 67/02; H04L 67/04; H04L 67/28; H04L 63/0281; H04N 21/234363
See application file for complete search history.

(56) References Cited

U.S. PATENT DOCUMENTS

| | | | |
|---|---|---|---|
| 5,930,472 A * | 7/1999 | Smith | H04L 63/0823 709/203 |
| 5,978,842 A | 11/1999 | Noble et al. | |
| 6,271,840 B1 | 8/2001 | Finseth et al. | |
| 6,356,908 B1 | 3/2002 | Brown et al. | |
| 7,051,084 B1 | 5/2006 | Hayton et al. | |
| 7,191,211 B2 | 3/2007 | Tuli | |
| 7,296,230 B2 | 11/2007 | Fukatsu et al. | |
| 7,310,769 B1 | 12/2007 | Dash | |
| 7,499,051 B1 | 3/2009 | O'Donnell | |
| 8,103,742 B1 | 1/2012 | Green | |
| 8,234,392 B2 | 7/2012 | Graffagnino et al. | |
| 8,314,809 B1 | 11/2012 | Grabowski et al. | |

(Continued)

OTHER PUBLICATIONS

Freytag, C. et al.,"Resource Adaptive WWW Access for Mobile Applications," © 1999, Elsevier Science Ltd., pp. 841-848.*

(Continued)

*Primary Examiner* — Cesar Paula
*Assistant Examiner* — James H Blackwell
(74) *Attorney, Agent, or Firm* — Knobbe, Martens, Olson & Bear LLP (57) ABSTRACT

An intermediary system operates as an intermediary between content servers and user devices, and provides services for improving page load times as seen by end users. One such service involves converting all or a portion of a retrieved content page (e.g., web page) into a stream of graphics commands, such as OpenGL commands, that can be executed by the user device's graphics processing unit (GPU). The intermediary system sends these commands to a browser component running on the user device for execution by the GPU.

21 Claims, 5 Drawing Sheets

(56) References Cited

U.S. PATENT DOCUMENTS

| | | |
|---|---|---|
| 8,331,566 B1 | 12/2012 | Foote et al. |
| 8,365,144 B1 | 1/2013 | Webb |
| 8,539,338 B2 | 9/2013 | Zhu et al. |
| 8,732,571 B2 | 5/2014 | Jain et al. |
| 8,769,052 B1 | 7/2014 | Tidd |
| 8,913,067 B1 | 12/2014 | Kokkevis |
| 8,913,068 B1 | 12/2014 | Kokkevis |
| 9,454,515 B1 | 9/2016 | Jain |
| 2001/0032238 A1 | 10/2001 | Cronin, III et al. |
| 2001/0038395 A1 | 11/2001 | Holtzblatt |
| 2002/0015042 A1 | 2/2002 | Robotham |
| 2002/0091738 A1* | 7/2002 | Rohrabaugh ......... G06F 9/4443 715/249 |
| 2003/0014478 A1 | 1/2003 | Noble |
| 2003/0158916 A1 | 8/2003 | Cronin, III et al. |
| 2003/0200507 A1 | 10/2003 | Stern et al. |
| 2004/0186861 A1 | 9/2004 | Phatak |
| 2004/0239681 A1 | 12/2004 | Robotham et al. |
| 2005/0232227 A1 | 10/2005 | Jorgenson et al. |
| 2005/0256836 A1 | 11/2005 | Awamoto et al. |
| 2007/0156972 A1 | 7/2007 | Uehara |
| 2007/0263007 A1 | 11/2007 | Robotham et al. |
| 2008/0034292 A1 | 2/2008 | Brunner |
| 2008/0077862 A1 | 3/2008 | Tolpin |
| 2008/0120626 A1 | 5/2008 | Graffagnino et al. |
| 2008/0222273 A1 | 9/2008 | Lakshmanan et al. |
| 2008/0229025 A1 | 9/2008 | Plamondon |
| 2008/0235594 A1 | 9/2008 | Bhumkar et al. |
| 2008/0295164 A1 | 11/2008 | Steiner et al. |
| 2009/0030976 A1 | 1/2009 | Shukla |
| 2009/0033986 A1 | 2/2009 | Himpe |
| 2009/0089448 A1 | 4/2009 | Sze et al. |
| 2009/0100356 A1 | 4/2009 | Kujda |
| 2009/0125799 A1 | 5/2009 | Kirby |
| 2009/0158141 A1 | 6/2009 | Bauchot et al. |
| 2009/0189890 A1* | 7/2009 | Corbett ................ G06F 9/505 345/419 |
| 2009/0228782 A1 | 9/2009 | Fraser |
| 2009/0238279 A1 | 9/2009 | Tu |
| 2009/0307571 A1 | 12/2009 | Gowda et al. |
| 2009/0307603 A1 | 12/2009 | Gowda et al. |
| 2010/0194753 A1 | 8/2010 | Robotham et al. |
| 2010/0269152 A1 | 10/2010 | Pahlavan et al. |
| 2011/0078333 A1 | 3/2011 | Jakubowski |
| 2011/0197126 A1 | 8/2011 | Arastafar |
| 2011/0225520 A1 | 9/2011 | Watanabe |
| 2011/0231746 A1 | 9/2011 | Rohrabaugh et al. |
| 2012/0022942 A1 | 1/2012 | Holloway et al. |
| 2012/0054166 A1 | 3/2012 | Jeremias |
| 2012/0102416 A1 | 4/2012 | Chmiel |
| 2012/0110435 A1 | 5/2012 | Green |
| 2012/0117145 A1 | 5/2012 | Clift et al. |
| 2012/0151094 A1 | 6/2012 | Cooke |
| 2012/0151308 A1 | 6/2012 | Falkenberg |
| 2012/0159308 A1 | 6/2012 | Tseng et al. |
| 2012/0188280 A1 | 7/2012 | Charlebois et al. |
| 2012/0215834 A1 | 8/2012 | Chen et al. |
| 2012/0254727 A1 | 10/2012 | Jain et al. |
| 2012/0265802 A1 | 10/2012 | Shen et al. |
| 2013/0050249 A1 | 2/2013 | Grabowski et al. |
| 2013/0080895 A1 | 3/2013 | Rossman et al. |
| 2013/0145259 A1 | 6/2013 | Kiefer, III et al. |
| 2013/0159923 A1 | 6/2013 | French |
| 2013/0185633 A1 | 7/2013 | Bunker |
| 2013/0212462 A1* | 8/2013 | Athas ...................... H04L 67/10 715/234 |
| 2014/0012685 A1 | 1/2014 | Le Chevalier |
| 2014/0053054 A1* | 2/2014 | Shen ................ G06F 17/30905 715/234 |
| 2014/0059421 A1 | 2/2014 | Chibisov et al. |
| 2014/0129920 A1 | 5/2014 | Sheretov et al. |
| 2014/0136942 A1 | 5/2014 | Kumar et al. |
| 2014/0136951 A1 | 5/2014 | Kumar et al. |
| 2014/0136971 A1 | 5/2014 | Kumar et al. |
| 2014/0136973 A1 | 5/2014 | Kumar et al. |
| 2014/0281896 A1 | 9/2014 | Wiitala et al. |
| 2015/0089355 A1 | 3/2015 | Peng et al. |
| 2015/0121193 A1 | 4/2015 | Beveridge et al. |
| 2015/0293929 A1 | 10/2015 | Namgung |

OTHER PUBLICATIONS

Fox, A. et al.,"Experience with Top Gun Wingman: A Proxy-Based Graphical Web Browser for the 3Com PalmPilot," © 1998, Springer-Verlag London Ltd., pp. 407-424.*

Zavou, A. et al.,"Exploiting Split Browsers for Efficiently Protecting User Data," © 2012, ACM, pp. 37-42.*

Ku, A.,"The Amazon Kindle Fire: Benchmarked, Tested, and Reviewed," © Nov. 23, 2011, tom's Hardware blog, 37 pages total.*

Xiao, X. et al.,"Browsing on Small Displays by Transforming Web Pages into Hierarchically Structured Subpages," © 2009, ACM, pp. 411-436.*

Han, R. et al.,"Dynamic Adaptation in an Image Transcoding Proxy for Mobile Web Browsing," © 1998, IEEE, pp. 8-17.*

Bjork, S. et al.,"WEST: A Web Browser for Small Terminals," © 1999, ACM, pp. 187-196.*

Bahl, P. et al.,"Advancing the State of Mobile Cloud Computing," © 2012, ACM, pp. 21-27.*

Buyukkokten, O. et al.,"Power Browser: Efficient Web Browsing for PDAs," © 2000, CHI Letters, vol. 2, Issue 1, pp. 430-437.*

Wang, X. et al.,"Accelerating the Mobile Web with Selective Offloading," © 2013, ACM, pp. 45-50.*

Tendulkar, V. et al.,"Abusing Cloud-Based Browsers for Fun and Profit," © 2012, ACM, pp. 219-228.*

Deboosere, L. et al.,"Thin Client Computing Solutions in Low-and High Motion Scenarios," © 2007, IEEE, 6 pages.*

Delwadia, V.,"RemoreME: Experiments in Thin-Client Mobile Computing," © 2009, MS Thesis, Victoria Univ. of Wellington, 114 pages.*

Dyken, C. et al.,"A Framework for OpenGL Client-Server Rendering," © 2012, IEEE, Intl. Conf. on Cloud Computing Technology and Science, pp. 729-734.*

Stokes, J.,"Amazon's Silk is More Than Just a Browser: Its a Cloud OS for the Client," © Sep. 28, 2011, Wired Magazine, 4 pages.*

Kokkevis, Vangelis "GPU Accelerated Compositing in Chrome" The Chromium Projects, 2012, 9 pages.

Anonymous, "ShrinkTheWeb (STW) Website Previews Plug in", http://web.archive.org/web/20120710154658/http://wordpress.org/extend/plugins/shrinktheweb-website-preview-plugin/screenshots/, Jul. 10, 2012, 3 pages.

Anonymous, "ShrinkTheWeb—Website Previews API Documentation", http://web.archive.org/web/20121029152521/http://www.shrinktheweb.com/uploads/STW_API_Documentation.pdf, Oct. 29, 2012, 4 pages.

Esteveo, Martin, "Tiling in DirectX: Part 1", from gamedev.net, Jul. 24, 2000, 5pgs.

Esteveo, Martin, "Tiling in OpenGL", from gamedev.net, Dec. 12, 2000, 6 pgs.

PCWorld, Hands-on: Chrome Remote Desktop app for Android makes remote PC access easy, available at http://www.pcworld.com/article/2144562/hands-on-chrome-remote-desktop-app-for-android-makes-remote-access-easy.html, published Apr. 16, 2014 (last accessed May 22, 2014), 4 pages.

Microsoft Windows Help, Connect to another computer using Remote Desktop Connection, available at http://windows.microsoft.com/en-us/windows/connect-using-remote-desktop-connection#connect-using-remote-desktop-connection=windows-7 (last accessed May 22, 2014), 2 pages.

Weintraub, Levi, "How WebKit Renders the Web", Fluent Conference, May 31, 2012, pp. 67. http://www.slideshare.net/naseemh/airbnb-tech-talk.

International Search Report and Written Opinion in PCT Application No. PCT/US2013/069733, dated Jun. 30, 2014.

Garsiel et al., "How Browsers Work: Behind the Scenes of Modern Web Browsers", http://www.html5rocks.com/en/tutorials/internals/howbrowserswork/ , Aug. 5, 2011, pp. 52.

(56) References Cited

OTHER PUBLICATIONS

Grosskurth et al., "Architecture and Evolution of the Modern Web Browser", http://grosskurth.ca/papers/browser-archevol-20060619.pdf, Jun. 20, 2006, pp. 24.

Jáquez, Víctor, "Herostratus' Legacy: Composited Video Support in WebKitGTK+", https://blogs.igalia.com/viaquez/2013/07/26/composited-video-support-in-webkitgtk/, Jul. 26, 2013, pp. 8.

Stefanov, Stoyan, "Rendering: Repaint, Reflow/Relayout, Restyle", http://www.phpied.com/rendering-repaint-reflowrelayout-restyle/, Dec. 17, 2009, pp. 11.

Wiltzius, Tom, "Accelerated Rendering in Chrome", http://www.html5rocks.com/en/tutorials/speed/layers/, Mar. 11, 2013, pp. 11.

Xiao et al., "Web Page Adaptation for Small Screen Mobile Device: A New P2P Collaborative Deployment Approach", First International Conference on Intelligent Networks and Intelligent Systems, 2008, pp. 191-196.

\* cited by examiner

Fig. 5

DISTRIBUTED BROWSING ARCHITECTURE FOR THE DELIVERY OF GRAPHICS COMMANDS TO USER DEVICES FOR ASSEMBLING A PLURALITY OF LAYERS OF A CONTENT PAGE

CROSS-REFERENCE TO CONCURRENTLY-FILED APPLICATIONS

The present application's Applicant is concurrently filing the following U.S. patent applications on May 22, 2014:

| Title | application Ser. No. |
| --- | --- |
| EMULATION OF CONTROL RESOURCES FOR USE WITH CONVERTED CONTENT PAGES | 14/285,317 |
| DELIVERY AND DISPLAY OF PAGE PREVIEWS USING HARDWARE-INDEPENDENT GRAPHICS COMMANDS | 14/285,492 |
| ON-DEMAND DETECTION OF USER INPUT TARGETS | 14/281,200 |
| CONVERSION OF CONTENT PAGES INTO SETS OF TILES FOR DELIVERY TO AND EFFICIENT DISPLAY ON USER DEVICES | 14/285,060 |
| TRANSFERRING DAMAGED PORTIONS OF A RENDERED PAGE TO A USER DEVICE | 14/285,275 |
| UPDATING DAMAGED PORTIONS OF RENDERED PAGES THAT CONTAIN VIDEO CONTENT | 14/285,334 |
| SPLIT BROWSER ARCHITECTURE CAPABLE OF DELIVERING VIDEO STREAMS TO USER DEVICES | 14/285,300 |
| DISTRIBUTED CONTENT BROWSING SYSTEM USING TRANSFERRED HARDWARE-INDEPENDENT GRAPHICS COMMANDS | 14/285,477 |
| BANDWIDTH REDUCTION THROUGH DELIVERY OF HARDWARE-INDEPENDENT GRAPHICS COMMANDS FOR PORTIONS OF CONTENT PAGES | 14/285,531 |
| CACHING OF CONTENT PAGE LAYERS | 14/285,557 |
| SPLIT BROWSER ARCHITECTURE CAPABLE OF DELIVERING LAYERS TO USER DEVICES | 14/285,442 |

The disclosures of the above-referenced applications are hereby incorporated by reference.

BACKGROUND

When a user requests a web page or other content page via a browser, the user typically experiences a noticeable delay before the page is fully or even partially displayed. Various factors can contribute to this delay. These factors include, for example, (1) the speed of the wireless or wired connection between the user's device and the Internet, (2) the location of, and load on, the origin server that hosts the page, (3) the size of the page, including any embedded graphics, (4) whether, and the extent to which, the page includes embedded objects that need to be separately retrieved (possibly from different domains) once the page's HTML has been loaded, (5) the complexity of the page's coding, including any scripts, and (6) the processing power of the user's device. When the delay is significant (e.g., several seconds or more), the task of browsing can be frustrating for users.

One way of rendering web pages or other content pages via a browser is to use graphics commands. OpenGL (Open Graphics Library) is a cross-language, multi-platform application programming interface (API) for rendering 2D and 3D vector graphics. The API is typically used to interact with a graphics processing unit (GPU), to achieve hardware-accelerated rendering. OpenGL can be used to draw primitives—points, line segments, or polygons—subject to several selectable modes. Primitives are specified, modes are set, and other graphics operations are described by issuing commands in the form of function calls. Some commands specify geometric objects to be drawn, and others control how the objects are handled during rendering. A system can make calls to OpenGL for commands to render a web page.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

The present disclosure involves an architecture in which the functions of a network content browsing system (e.g., a "web browser" application) are distributed among a browser component running on a server and a browser component running on a user device. The server-based browser component can retrieve content (e.g., web pages) on behalf of a user device, and generate, for delivery to the user device, a stream of graphics commands for rendering the content. The stream of graphics commands may be encoded by the server-based browser. The sever-based browser may provide the encoded graphics commands to the browser component running on the user device. In this configuration, the server-based browser component may be referred to as a "headless browser," and the browser component running at the user device may be referred to as a "client browser." The client browser can decode an encoded stream of graphics commands to display requested content without the content processing that would normally be required on the user device.

For at least some types of content pages and content, the above process results in reduced "page-load" times as experienced by users. This reduction is due in-part to the reduced or eliminated need for the client browser to process the page coding (e.g., HTML, JavaScript, etc.) of the pages. In some cases the process also reduces the quantity of data transmitted to the user device.

Typically, a browser implemented on a user device will perform three actions to render a content page (e.g., a web page) for display to the user. First, for a given uniform resource locator (URL), the browser will download the page content including HTML (Hypertext Markup Language) coding and any other content such as images or video. Second, the browser will render the content into a document object model (DOM) representation of the page. The DOM is an object-oriented interface supported by most popular web browsers through which a displayed content page can be accessed and manipulated. The DOM provides a structured graph representation of a content page with nodes that represent each HTML tag. Third, the browser will render the DOM into visualized content for display. However, implementing the browser on the user device can result in significant delays for page loads, for example in mobile devices having limited computing resources. In mobile devices, content page rendering can additionally cause a significant drain on battery life.

As an alternative to implementing the browser fully on the user device, an intermediary system, for example a headless browser implemented on a remote server or other device, can be used to perform the first two steps of the content page rendering process described above, offloading some of the processing required to access the content page from the user device to the intermediary system. For example, the intermediary system may retrieve and pre-render a content page for a user device, and then deliver to pre-rendered page to the user device as one or more bitmap images. Although this approach is reduces user-perceived page load times for many pages, the transfer of bitmap images sometimes consumes significant network bandwidth and introduces delay.

The foregoing and other problems are addressed, in some embodiments, by implementing the command interception rendering techniques described herein in which an intermediary system generates the DOM of a content page and the graphics commands needed to render the content page and then sends the graphics commands and associated content to a user device. The GPU of the user device executes the graphics commands to render a visual representation of the content page. Thus, the task of rendering the page is divided between the intermediary system and the user device. Such command interception rendering techniques can provide performance improvements including significant reductions in page load times compared to running the browser entirely on the user device, and can additionally provide performance improvements including reduction in bandwidth usage. In some cases, the intermediary system may execute a first portion of the graphics commands associated with a content page to deliver pre-rendered content of a portion of the content page and may send a second portion of the graphics commands to the user device for execution on the user device. The intermediary system and/or user device may determine whether a given graphics command or set of graphics commands should be executed on the intermediary system versus the user device based on an assessment of which option will provide a better (shorter) user-perceived page load time, reduction in processing time or resources of the user device, or reduction in battery usage of the user device, among other factors.

In some embodiments, one or both of the user device and intermediary system can assess, for a given content page, whether transferring the graphics command representation of the content page to the user device will reduce a user-perceived page load time or provide other performance benefits relative to at least one alternative rendering technique. In some cases, the user device and/or intermediary system can determine whether the command interception rendering technique is advantageous for a given page load based on a number of factors, for example the speed, bandwidth, latency, and type of network connection with user device as well as characteristics of the content site and whether this feature is supported by the user device. In one example, the user device and/or intermediary system can assess whether generating the graphics commands on the intermediary system will reduce a user-perceived page load time relative to generating the graphics commands on the user device. Further, in some cases, network connections between the intermediary system and the host systems of the content pages may be much faster than between the user device and the host systems. In such cases, it may be faster for the user device to receive graphics commands representing the content page from the intermediary system than to receive the content page itself from the host system of the content page.

The DOM is a well-documented utility that has been dealt with at length by the World Wide Web Consortium (www.w3.org). One skilled in the art will be familiar with the DOM and therefore the details of the DOM will not be presented herein. Although the present disclosure refers to the Document Object Model in particular, this is for purposes of illustration and not limitation, and other representations of content pages that allow the identification of page elements based upon the structure of a page can be used.

In the process described herein, the bandwidth-intensive bitmap typically used to send pre-rendered page content from the intermediary system to the user device can be replaced partially or completely by more bandwidth efficient graphics commands. To illustrate, sending an OpenGL command "draw bg red" indicating that the background of the content page should be drawn red can save bandwidth compared to sending a bitmap of a large number of red background pixels. As another illustration, if a box is merely being moved to another location within a content page, sending an OpenGL command to move the box saves bandwidth compared to sending an updated bitmap of the page. Further, OpenGL commands are not lossy, saving additional bandwidth and improving the user experience with displayed graphics. In some embodiments, a stream of OpenGL commands delivered to a user device can be compressed.

In some embodiments, updates to a content page made using the command interception rendering techniques described herein can require significantly less bandwidth usage compared conventional headless browser page updates. For example, instead of sending a new bitmap of the updated page, an intermediary system implementing the command interception rendering technique can send updated graphics commands relating to only the page elements that are being updated. To illustrate, a user may scroll downward on a content page that is larger than the display window, hiding page content in an upper page area that was previously displayed, revealing page content in a lower page area that was previously outside of the display window, and shifting page content in a middle page area by the distance of the scroll. According to the command interception rendering technique, the intermediary system can send graphics commands including commands to no longer display the page content in the upper page area, updated locations for the page content in the middle page area, and primitives and location information for the page content in the lower page area. In some embodiments, the intermediary system may send graphics commands for rendering the entire content page to the user device in response to the user request for the content page, so that, in the instance that the network connection is interrupted while the user is viewing the page, the user may still be able to scroll through the page.

In one embodiment, the command interception rendering technique can be implemented for all of the content of a content page. In some embodiments, the technique can be implemented only for those portions of a content page for which a greater efficiency will be achieved. Other rendering techniques can be used for the remaining portions of the content page, for instance rendering techniques more suitable for specific types of content, such as image or video.

As an example, the user device may send a request for a content page to the intermediary system. The intermediary system can retrieve the content of the content page, for example HTML and image files, from the host system of the content page. The intermediary system can generate a DOM tree of the content page including one or more layers. The intermediary system can then generate an OpenGL command stream for rendering the content in the DOM tree. The OpenGL command stream may be intercepted from the graphics pipeline of the intermediary system's headless browser. The intercepted OpenGL commands may be serialized, and then provided to the user device for rendering a visual representation of the content page on a display of the device. For example, the OpenGL commands may instruct the user device regarding how to assemble layers of the content page as determined in the DOM. If portions of the content page cannot be rendered from OpenGL commands, in some embodiments such portions can be pre-rendered as a bitmap by the intermediary system. The bitmap can be provided to the user device together with the OpenGL command stream, and the OpenGL command stream can include instructions for the user device regarding where to render the bitmap on the content page. The intermediary system can also provide the user device with interactivity instructions regarding interactivity areas and specific actions or events associated with user input in the interactivity areas.

As the user interacts with the rendered page, the user device can notify the intermediary system of the user interactions. These interactions may include, for example, scrolling, zooming, and selections of interactive display elements. The intermediary system can respond by sending updated OpenGL commands, as needed, for updating the visual representation of the content page on the user device.

Aspects of the present disclosure relate to splitting the graphics pipeline of a browser application among server-based and client-based browser components (e.g., between a headless browser and a client browser). The server (or servers) on which a headless browser instance is running may have access to a network connection that is substantially faster than the network connection available to the user device, and can therefore retrieve content much more quickly than the user device. Alternatively or in addition, the intermediary system's server(s) may have substantially more computing resources than the user device, and may therefore perform the content processing summarized above and described in greater detail below much more quickly and efficiently than the user device. As a result of the faster network connection and/or greater available computing resources, a headless browser instance running on a server may be able to produce graphic commands for rendering content pages faster than a conventional browser application executing on a user device is able to produce the graphics commands.

Although aspects of the embodiments described in the disclosure will focus, for the purpose of illustration, on a distributed browsing system with separate server-based and client-based browser components designed specifically to work in conjunction with one another (e.g., a headless browser instance running on a server and a corresponding client browser instance running on a user device), one skilled in the art will appreciate that the techniques disclosed herein may be applied to any number of services, processes, or applications. In some embodiments, an existing browser application that runs on a user device may be configured to receive encoded graphics commands from a server in lieu of unprocessed content files. For example, a browser add-in or extension may be installed on a user device to facilitate communication with a headless browser, receive encoded graphics commands, and decode the graphics commands, thereby bypassing the parsing/DOM tree construction/instruction generating processes that would normally be performed by the browser application. In some embodiments, browsers executing on user devices may be designed to receive either conventional content files or encoded graphics commands (or a combination thereof). For example, the browser may determine whether to request content files or encoded graphics commands based on current conditions and performance metrics, data regarding prior browsing sessions, or the like. Alternatively or in addition, an intermediary system may determine whether to provide content files or encoded graphics commands based on current conditions, performance metrics, prior browsing sessions, or the like.

Although aspects of the embodiments described in the disclosure will focus, for the purpose of illustration, on the OpenGL graphics library, one skilled in the art will appreciate that the techniques disclosed herein may be applied to graphics commands in other graphics libraries or application programming interfaces. Further, although various aspects of the process will be described with regard to illustrative examples and embodiments, one skilled in the art will appreciate that the disclosed embodiments and examples should not be construed as limiting.

Various aspects of the disclosure will now be described with regard to certain examples and embodiments, which are intended to illustrate but not limit the disclosure.

System Components

Figure 1:
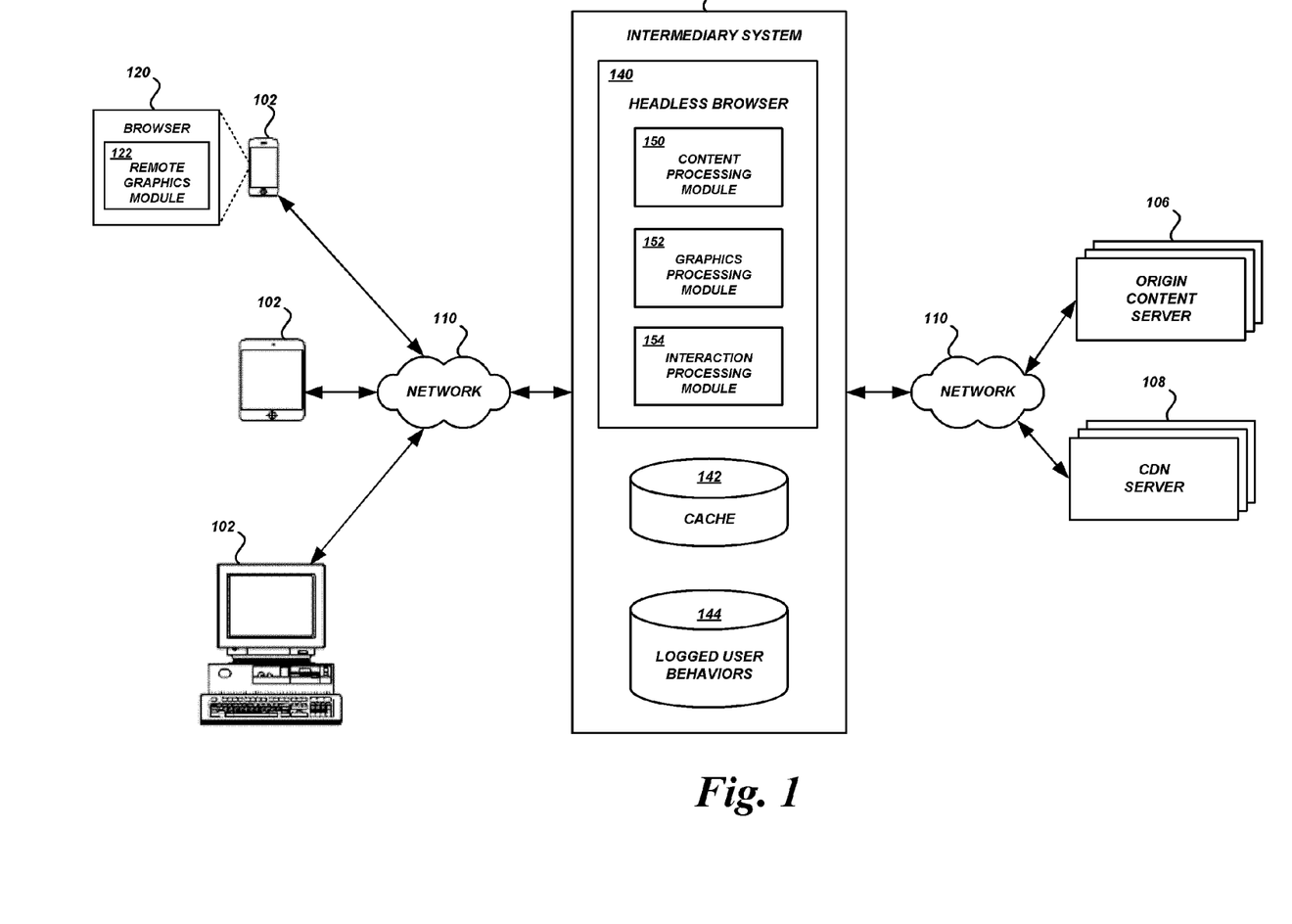
FIG. 1 illustrates an embodiment of a content delivery environment with an intermediary system that processes content and generates display commands for execution on user devices.

FIG. 1 illustrates an example network environment in which features can be implemented for processing content pages on an intermediary system and generating display commands for execution by a user device. The network environment shown in FIG. 1 includes various user devices 102, an intermediary system 104, and various content sources, including origin content servers 106 and content delivery network ("CDN") servers 108. The system components may communicate with each other via one or more communication networks 110 in order to deliver, to user devices 102 via intermediary system 104, encoded graphics commands for rendering content pages hosted on the CDN servers 108. A network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

As will be appreciated by those of skill in the relevant art, the network environment may include any number of distinct user devices 102 and/or content sources 106, 108. In addition, multiple (e.g., two or more) intermediary systems 104 may be used. For example, separate intermediary systems 104 may be located so that they are close (in either a geographical or networking sense) to groups of current or potential user devices 102 or content sources 106, 108. In such a configuration, a user device 102 may request content via the intermediary system 104 to which it is closest, rather than all user devices 102 requesting content via a single intermediary system 104.

The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 102 may execute a browser application 120 to communicate via the network 110 with other computing systems, such as the intermediary system 104 or content sources 106 and 108, in order to request and display content.

Illustratively, a user may use a browser application 120 to request network-accessible content (e.g., content pages, images, video, etc.) hosted or provided by a content source, such as an origin content server 106 or a CDN server 108. The user device 102 or browser application 120 may be associated with the intermediary system 104 or otherwise configured to request the content through, and receive content display commands from, the intermediary system 104 rather than communicating directly with the content source. The browser application 120 may include a remote graphics module 122 that receives remotely-generated graphics commands and other display commands, such as those generated by the intermediary system 104. For example, the remote graphics module 122 can implement OpenGL for interacting with the device graphics processing unit (GPU). In some embodiments, the remote graphics module 122 may include the GPU and its components, including an input connection for data and power, a processor, a memory, and an output connection for communicating with a display. The remote graphics module 122 (or some other module of the browser application 120) can execute the remotely-generated graphics commands to display a representation of the requested content on the user device 102. Advantageously, the remote graphics module 122 may facilitate the display of graphical representations of requested content on the user device 102 without requiring the user device 102 to receive content files (e.g., HTML files, JPEG images, etc.) directly or indirectly from content sources 106 and 108.

In some embodiments, the browser 120 may be a conventional web browser that is not specifically designed or configured to execute remotely-generated graphics commands and other display commands. For example, the browser 120 may use or otherwise be associated with a remote graphics module 122 that is not integrated with the browser 120, such as a browser add-in or extension. In some embodiments, applications other than a browser 120 may include or use a remote graphics module 122 (or some similar module) to execute graphics commands generated by an intermediary system 104. For example, content aggregators or other specialized content display applications for mobile devices (e.g., Flipboard) may utilize a remote graphics module 122.

The intermediary system 104 can be a computing system configured to retrieve content on behalf of user devices 102 and generate display commands for execution by the user devices 102. For example, the intermediary system 104 can be a server or group of servers that may be accessed via the network 110. In some embodiments, the intermediary system 104 may be a proxy server, a system operated by an internet service provider (ISP), and/or some other device or group of devices that retrieve content on behalf of user devices 102.

The intermediary system 104 may include various modules, components, data stores, and the like to provide the content retrieval and processing functionality described herein. For example, the intermediary system 104 may include a server-based browser application or some other content rendering application to process content retrieved from content sources. Such a content rendering application may be referred to as a "headless browser" 140. Generally described, a headless browser 140 does not (or is not required to) cause display of content by a graphical display device of the server on which the headless browser 140 is executing. Instead, the headless browser 140 provides display commands to separate user devices 102. Illustratively, the headless browser 140 may obtain requested content from an origin content server 106 and/or CDN server 108, obtain additional items (e.g., images and executable code files) referenced by the requested content, execute code (e.g., JavaScript) that may be included in or referenced by the content, generate graphics commands to display a graphical representation of the content, and transmit the graphics commands to the user device 102. By performing some or all of these operations at the intermediary system 104, the substantial computing resources and high-speed network connections typically available to network-based server systems may be leveraged to perform the operations much more quickly than would otherwise be possible on a user device 102 with comparatively limited processing capability.

The headless browser 140 may include various modules to provide the functionality described above and in greater detail below. For example, the headless browser 140 may include a content processing module 150, a graphics processing module 152, and an interaction processing module 154. The content processing module 150 may include any system that can parse content files and generate a document object model ("DOM") representation of the content. Further, in some cases, the content processing module 150 may include logic for determining one of a number of rendering techniques to use for each of a number of types of content of a content page, for example determining what types of content should be represented by OpenGL commands to be provided to the browser 120 and/or the remote graphics module 122. The graphics processing module 152 may include any system that can receive the DOM representation and generate graphics commands (i.e., OpenGL commands) to render a graphical representation of the content on a user device 102. The graphics commands generated by the graphics processing module 152 can be provided to the browser 120 and/or the remote graphics module 122. In some embodiments, the graphics processing module 152 instead of, or in addition to, the content processing module 150 may determine how to render each of a number of types of content of a content page. The interaction processing module 154 may include any system that communicates with the browser 120 to receive information regarding interactions with the content at the user device 102 and to update the graphics commands for rendering the content, if necessary. Further, the interaction processing module 154 may provide the graphics commands to the user device 102. In some embodiments, a headless browser 140 may include additional or fewer modules than those shown in FIG. 1.

As an example, the headless browser may be implemented using the open source Chromium™ browser, with appropriate modifications to implement the graphics command interception techniques and the other features described herein. In some embodiments, Chromium™ code may be modified to intercept the graphics commands and send the intercepted commands to a user device. Although the rendering techniques described herein refer to interception of graphics commands, it will be appreciated that this refers to the embodiment of modifying a preexisting browser component that is designed to locally execute the graphics commands, in which the modifications allow the rendering technique to intercept the graphics commands as they are passed to the next stage for execution. In other embodiments, a headless browser component can be developed specifically to implement the graphics commands delivery techniques described herein; such a headless browser may automatically send the graphics commands to the user device such that no interception is necessary.

The intermediary system 104 may include additional modules, components, data stores, and the like to provide the features described above and in greater detail below. For example, the intermediary system 104 may include a cache 142 that stores content items received form content sources 106 and 108, graphics commands generated by the headless browser 140, and the like. The intermediary system 104 may also include a logged user behaviors data store 144 that stores information about user requests and interactions with content.

In some embodiments, the cache 142 may store the graphics instructions generated by the headless browser 140 for rendering content pages for a predetermined period of time after the content page request or after connection between the user device and the intermediary system has terminated. Accordingly, if the user of the user device requests the content page again within the predetermined time period, the graphics instructions and any other data can be retrieved from the cache 142 and delivered to user device 102 without the need to re-generate the graphics instructions. In some embodiments, persistence of graphics instructions data in the cache 142 can reduce user-perceived page load times for recently requested pages. For instance, if a user device runs out of battery power or otherwise powers down in the middle of a browsing session, the graphics instructions may be quickly retrieved and re-delivered to the user device upon powering on and reestablishing connection with the intermediary system 104. In some embodiments, interactions stored in the logged user behaviors data store 144 can be used to deliver graphics instructions for rendering a representation of the content page reflecting previous user interactions with the page. In other embodiments, the cache 142 may store graphics instructions representing a most recent visual representation displayed on the user device.

The intermediary system 104 may be a single computing device, or it may include multiple distinct computing devices, such as computer servers, logically or physically grouped together to collectively operate as an intermediary system. The components of the intermediary system 104 can each be implemented as hardware, such as a server computing device, or as a combination of hardware and software. In addition, the modules and components of the intermediary system 104 can be combined on one server computing device or separated individually or into groups on several server computing devices. In some embodiments, the intermediary system 104 may include additional or fewer components than illustrated in FIG. 1.

In some embodiments, the features and services provided by the intermediary system 104 may be implemented as web services consumable via the communication network 110. In further embodiments, the intermediary system 104 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The origin content servers 106 and CDN servers 108 can correspond to logical associations of one or more computing devices for hosting content and servicing requests for the hosted content over the network 110. For example, a content server 106 or CDN server 108 can include a web server component corresponding to one or more server computing devices for obtaining and processing requests for content (such as content pages) from user devices 102, the intermediary system 104, or other devices or service providers. In some embodiments, one or more content servers 106 may be associated one or more CDN service providers (e.g., entities that manage multiple CDN servers 108), application service providers, etc.

Although in the examples described herein the intermediary system 104 is configured to communicate between the origin content servers 106 and CDN servers 108 and user devices 102 to execute the command interception rendering techniques, in some embodiments the origin content servers 106 and/or CDN servers 108 can be configured to generate graphics command representations of content pages and send the graphics commands directly to a user device. For example, the capability to perform the command interception rendering techniques can be provided to origin content servers 106 and CDN servers 108 in the form of an add-in or extension. The origin content servers 106 or CDN servers 108 can, in some embodiments, assess whether the command interception rendering techniques should be used for a given page request based on factors such as whether the techniques would result in reduced user-perceived page load time, processor usage, or battery usage, among other things, relative to at least one alternative rendering technique. In some cases, the content servers 106 or CDN servers 108 can determine whether the command interception rendering technique is preferable for a given page load based on a number of factors, for example the speed, bandwidth, latency, and type of network connection with user device as well as characteristics of the content site and whether this feature is supported by the user device. Accordingly, any of the command interception rendering actions described herein as being performed by the intermediary system can, in some embodiments, be performed additionally or exclusively by the origin content servers 106 and/or CDN servers 108, in which case the intermediary system 104 may be omitted.

Example Component Communications

Figure 2:
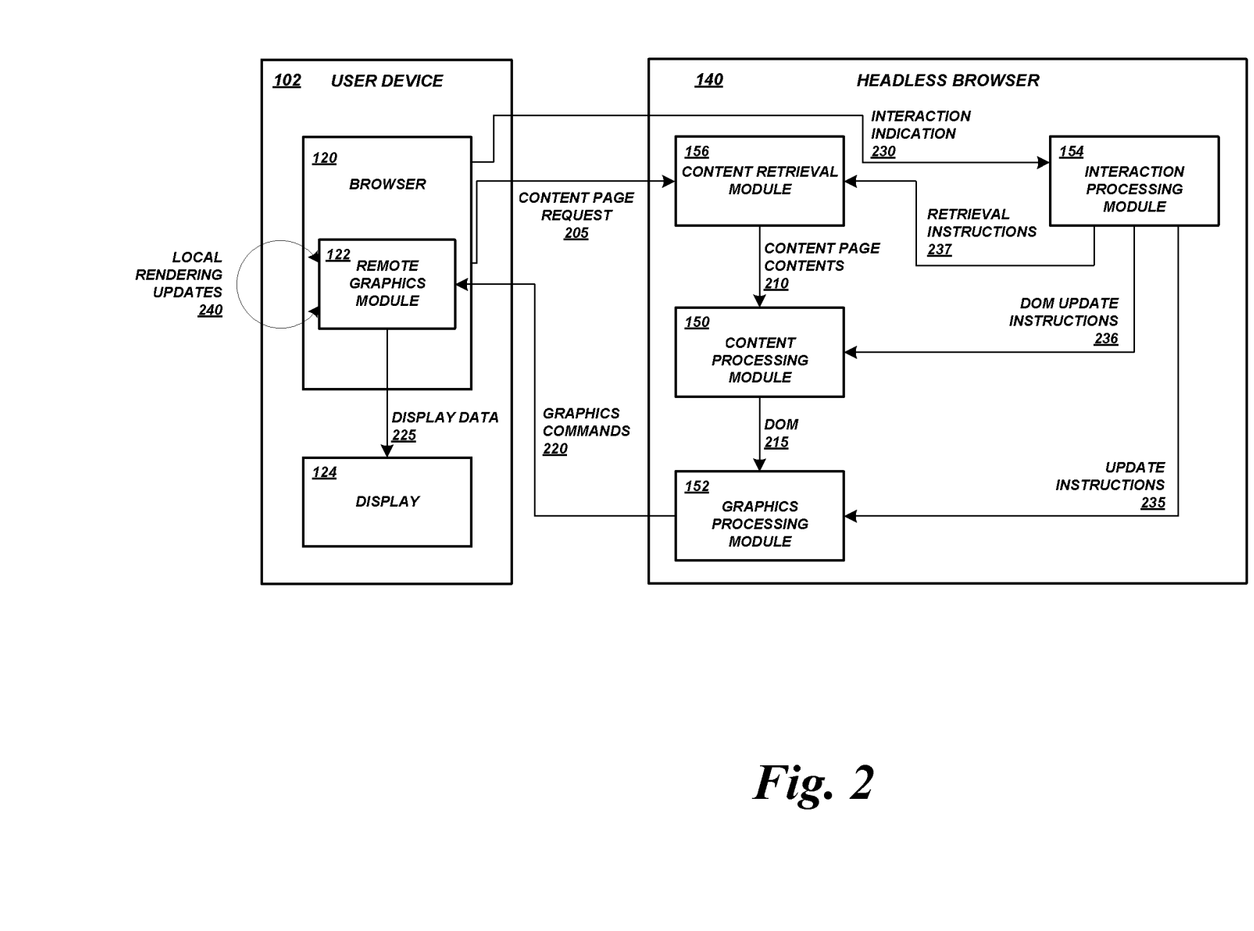
FIG. 2 illustrates an embodiment of communications between a user device and an intermediary system for generating a visual representation of a content page.

FIG. 2 illustrates an embodiment of communications between a user device and an intermediary system for generating a visual representation of a content page. Although the illustrated communications involve the user device 102 and headless browser 140 of FIG. 1, similar communications can take place between any client device and intermediary system capable of executing the command interception rendering techniques described herein.

As illustrated, the browser 120 of the user device 102 can send a request for a content page 205 to content retrieval module 156 of the headless browser 140. The content page request 205 can be, for example, a web page request generated when the user selects a user-selectable option directing the browser 120 to the web page's URL.

The content retrieval module 156 can retrieve the content of the content page, for example HTML and image files, from the host system of the content page. In some implementations, the network connection between the content retrieval module 156 and the host system may be faster than the network connection between the user device 102 and the host system, thereby reducing latency in rendering the content page for the user. The content retrieval module 156 can send the content page contents 210 to the content processing module 150.

Content processing module 150 can generate a DOM tree of the content page, for example including one or more objects and, in some embodiments, one or more layers. The content processing module 150 can send the DOM tree data 215 to the graphics processing module 152.

Graphics processing module 152 can then generate an OpenGL command stream for rendering the content in the DOM tree in one embodiment. In some embodiments, the OpenGL commands may be serialized. Other graphics libraries can be used in other embodiments, though for purposes of illustration the examples herein are described in the context of OpenGL. In a conventional headless browser, the OpenGL command stream would be used to pre-render the content page within the headless browser, which would then deliver a bitmap or other graphical representation of the content page to the user device. However, in order to preserve bandwidth, the OpenGL command stream may be intercepted from the graphics processing module 152 of the headless browser 140, and then the graphics commands 220 can be provided to the remote graphics module 122 of the user device 102. In some embodiments, if portions of the content page cannot be rendered from OpenGL commands, such portions can be pre-rendered as a bitmap by a rendering module of the headless browser 140. The bitmap can be provided to the remote graphics module 122 as part of the graphics commands data 220.

The remote graphics module 122 can use the graphics commands 220 for rendering a visual representation of the content page on a display 124 of the device 102. For example, the OpenGL commands may instruct the remote graphics module 122 regarding how to assemble layers of the content page as determined in the DOM. To illustrate, a content page can include a layer for each of a main content portion, a left menu portion, and an upper menu portion. The graphics commands 220 can include instructions to draw the objects for each of these portions to a separate canvas. If portions of the content page cannot be rendered from OpenGL commands, in some embodiments the remote graphics module 122 may be provided with a bitmap of such portions and a command for where to render the bitmap can be included in the OpenGL command stream. The remote graphics module 122 can use these instructions to render the bitmap in the correct location on the content page.

Instructions for displaying the visual representation of the content page can be sent as display data 225 to the display 124. Display data 225 can indicate how to use the pixels (or voxels) of display 124 to display an image of the content page (or a portion of the content page corresponding to a viewable window based on scrolling or zooming) to the user. Display 124 may be incorporated into user device 102 or external to device 102, and can be any type of known display including LED, LCD, plasma, stereoscopic, and may incorporate touch-sensitive technologies.

The browser 120 can also detect indications 230 of user interaction with elements of the content page, such as user-selectable options (e.g., a hyperlink URL, a graphical button for adding an item to a digital cart, etc.), scrolling, or zooming. The remote graphics module 122 can also be configured to perform local rendering updates 240 in some embodiments. For example, the provided graphics commands may include vector graphics for rendering some or all of the content of a content page. Due to the scalability of vector graphics, the remote graphics module 122 may be able to use the provided vector graphics to render updates in response to zoom input from the user. In some embodiments, graphics instructions for a larger portion of the content page than is initially viewable in a browser viewport can be sent, and accordingly the remote graphics module 122 can use the graphics instructions to locally handle scrolling through the content that is displayed in the viewport. In some embodiments the browser 120 may have received a URL corresponding to video content from the headless browser 140, and accordingly may be able to handle the update to the portion of the content page including the video without sending a request to the headless browser 140.

The browser 120 can send these indications 230 to the interaction processing module 154 of the headless browser 140. In some embodiments, browser 120 may be able to handle some interactions locally, for example if the graphics instructions provided enable browser 120 to display a zoomed view of the graphics. In some embodiments, graphics commands can include additional content viewable by scrolling, and browser component can maintain the additional content hidden until user input indicates a command to scroll to the additional content.

For any interactions that cannot be handled locally using the provided graphics instructions, browser 120 can send the indications 230 of user interaction to the interaction processing module 154 of the headless browser 140. Interaction processing module 154 can determine whether any updates to the visual representation of the content page are necessitated by the user interaction with the elements of the content page. In some embodiments, interaction processing module 154 can determine whether any updates to the visual representation of the content page are necessitated by something other than user interaction. For example, animated content such as videos and/or programmatic updates such as a script or javascript of the content page running on the intermediary system can trigger updates to the visual representation of the content page in some embodiments.

In some examples, interaction processing module 154 may determine that the interaction indication requires additional content retrieval, and can send retrieval instructions 237 to the content retrieval module 156 indicating what additional content should be retrieved. For example, a user may select an option to navigate away from the current content page to another content page or to load a new content page.

In some examples, interaction processing module 154 may determine that the interaction indication does not require additional content retrieval but does require an update to the DOM, and can send DOM update instructions 236 to the content processing module 150 indicating what updates to perform to the DOM. For example, page content or layout can change due to execution of a script running on the headless browser, or due to user selection of a drop-down menu. Accordingly, updates to the DOM can provide updates for user manipulation of or programmatic changes to existing content.

In some examples, interaction processing module 154 may determine that the interaction indication does not require additional content retrieval nor an update to the DOM, and can send update instructions 235 to the graphics processing module 152 indicating what updates to perform to the graphics commands. For example, a hyperlink, once selected, may change from a first color to a second color. The interaction processing module 154 can determine that such a user interaction with the hyperlink causes an update to the visual representation of the content page. Accordingly, the interaction processing module 154 can send update instructions 235 to the graphics processing module 152 to generate and send updated graphics commands 220 for display of the hyperlink in the second color. As another example, the user may scroll to reveal a new portion of the content page. In some embodiments, the initial graphics commands 220 may include commands for rendering more of the content page than is initially viewable in the viewport of the browser 120. In one embodiment graphics commands for the entire content page can be sent in response to the user request for the content page, such that the user can continue to browse the content page even if the network connection between the user device 102 and the headless browser 140 is interrupted. Accordingly, scrolling to a new portion of the content page may not necessitate sending an interaction indication 230 to the headless browser 140. In some embodiments, the interaction indication 230 can be sent, but the interaction processing module 154 may determine that no updated commands are needed.

Example Command Interception Rendering Techniques

Figure 3:
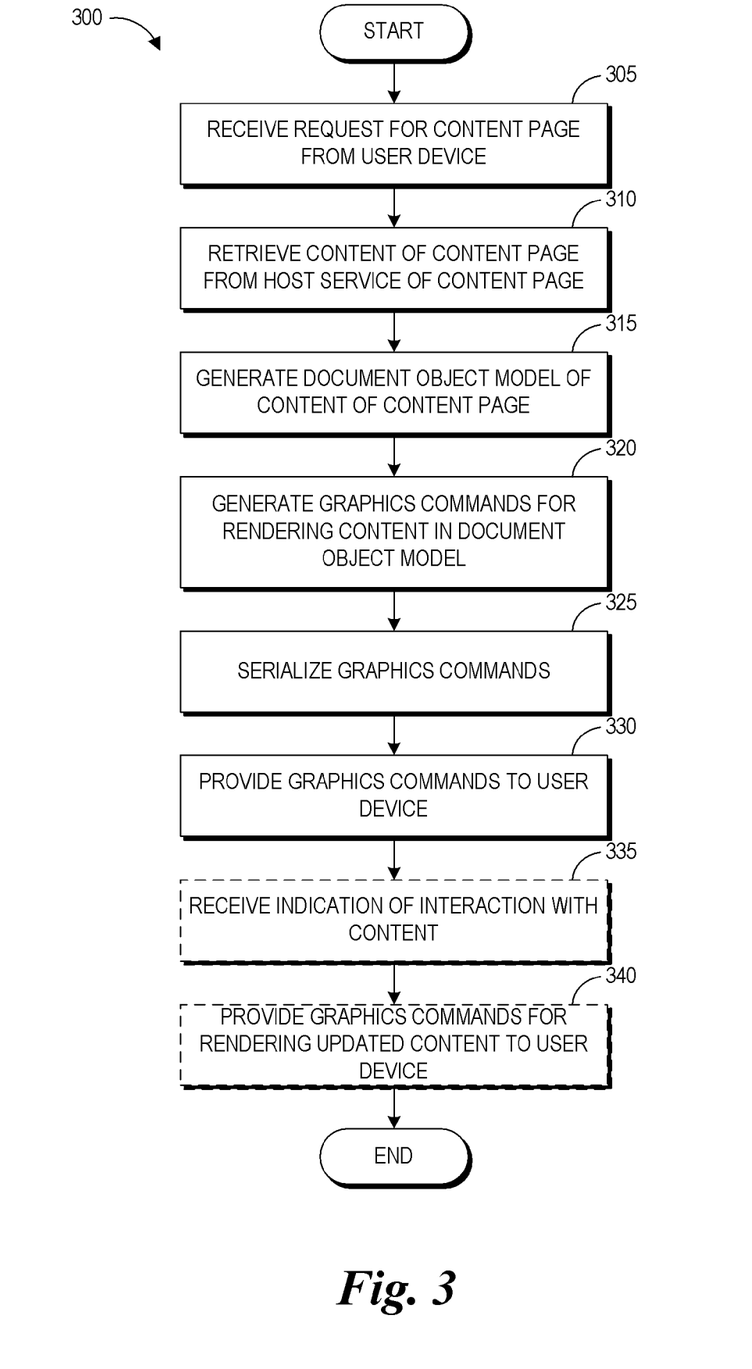
FIG. 3 illustrates an embodiment of a command interception rendering technique as implemented by an intermediary system.

FIG. 3 illustrates an embodiment of a command interception rendering process 300 as implemented by an intermediary system. For purposes of illustration, the process 300 is discussed herein as being implemented by the components of the headless browser 140 of FIGS. 1 and 2.

At block 305, the headless browser 140 receives a request for a content page from a user device, for example from browser 120 of user device 102. The headless browser 140 can receive the request via one or more communication networks 110, such as the Internet or a private network, personal area network, local area network, wide area network, cable network, satellite network, cellular telephone network, etc. or combination thereof, each with access to and/or from the Internet. The request for the content page can include an identifier of the content page. The identifier may be based on a content page location represented by, for example, a uniform resource locator (URL) or a uniform resource indicator (URI), and may be received from a user at the browser 120. In some embodiments, the block 305 may also include sending device configuration data and/or metadata associated with the user device 102 to the intermediary system 104. This device configuration data may include any type of data relating to the configuration of the user device 102. For example, the device configuration data may include data relating to screen size, amount of graphics memory, amount of random access memory (RAM), amount of storage space allocated to the browser 120, amount of RAM allocated to the browser 120, screen resolution, operating system version, zoom capability of the user device 102, supported font sizes, supported font types, and the like. In some embodiments, the user device may alternatively send a device identifier that can be used by the intermediary system to look up previously-stored information about the device.

At block 310, the content retrieval module 156 of the headless browser 140 retrieves content page contents, for instance one or more of HTML content, XML content, images, and videos. For example, the content retrieval module may retrieve an HTML document, and may then retrieve any inline objects (e.g., images) referenced by the HTML document. The content retrieval module 156 can retrieve the contents from a corresponding origin content server 106. Alternatively, or in addition, the content page or portions thereof may be accessed from one or more CDN servers 108. The content retrieval module 156 can send the content page contents 210 to the content processing module 150.

At block 315, the content processing module 150 can generate a DOM of the content page. The DOM can organize the content of the requested content page, for example into a tree structure including objects and layers of the content page. Each layer can correspond to a different portion of the page in some embodiments, for example a scrollable main content portion and fixed-location top and side menu bars. The content processing module 150 can send the DOM tree data 215 to the graphics processing module 152.

At block 320, graphics processing module 152 can then generate graphics commands for rendering the objects and layers in the DOM tree. In one embodiment, the graphics commands can include an OpenGL command stream for rendering the content. Other graphics libraries can be used in other embodiments, such as Skia or proprietary hardware-specific graphics libraries. In some embodiments, if portions of the content page cannot be rendered from OpenGL commands, such portions can be pre-rendered as bitmaps, JPEGs, GIFs, tiffs, or other image file types that can include pictures or images of portions of the content page by a rendering module of the headless browser 140. The process 300 can transition to block 325 in which the graphics commands are serialized.

At block 330, as discussed above, in order to preserve bandwidth, the graphics command stream may be intercepted from the graphics processing module 152 of the headless browser 140 and provided to the user device. In some embodiments, the pre-rendered portions of the content page can be provided to the remote user as part of the graphics commands data. In certain embodiments, the process 300, or portions thereof, are performed continuously at least until a graphics command are provided to the user device 102 that corresponds to the entire content page with all of its content resources. Alternatively, sets of graphics commands may be provided to the user device 102 on a constant, but intermittent basis (e.g., every 10 ms, 100 ms, 500 ms, etc.). As another alternative, or in addition, sets of graphics commands may be provided each time an additional content resource included on the content page is retrieved by the headless browser 140. The decision of how frequently to perform or re-perform portions of the process 300 (e.g., the provisioning of updated sets of graphics commands to the user device 102) may be based at least partially on a number of factors. These factors may include, for example, settings by a user (e.g., an administrator, a user associated with the client device 102, a user associated with the content page requested at the block 302), configuration data associated with the user device 102, bandwidth available to the user device 102 and/or the intermediary system 104, and the like.

The process 300 also includes optional blocks 335 and 340 for handling interactivity of the page, for example providing updated graphics commands based on user interaction with the content page as rendered on the user device. At optional block 335, the interaction processing module 154 of the headless browser 140 can receive, from the user device, an indication of user interaction with elements of the content page. User interaction can include selection of user-selectable options, scrolling, zooming, touch input, cursor clicks, or text input, to name a few.

At block 340, one or both of the interaction processing module 154 or the graphics processing module 152 can send graphics instructions for rendering the updated content to the user device based on the changes to the visual representation of the page resulting from the user interaction. Blocks 335 and 340 can be repeated, in some embodiments, when a new indication of user interaction with the content page is received by the headless browser 140.

Blocks 335 and 340 can be executed by the process 300 in embodiments in which the headless browser 140 provides updates to the user device and receives an updated page request from the user device. However, in some embodiments blocks 335 and 340 can be omitted. For example, the graphics commands sent in response to the user request for the content page may include commands for rendering the entire content page, for instance so that the user can continue to browse the content page even if the network connection between the user device and the headless browser 140 is interrupted. Accordingly, the user device may handle the updates based on the previously sent graphics commands and blocks 335 and 440 can be omitted.

Figure 4:
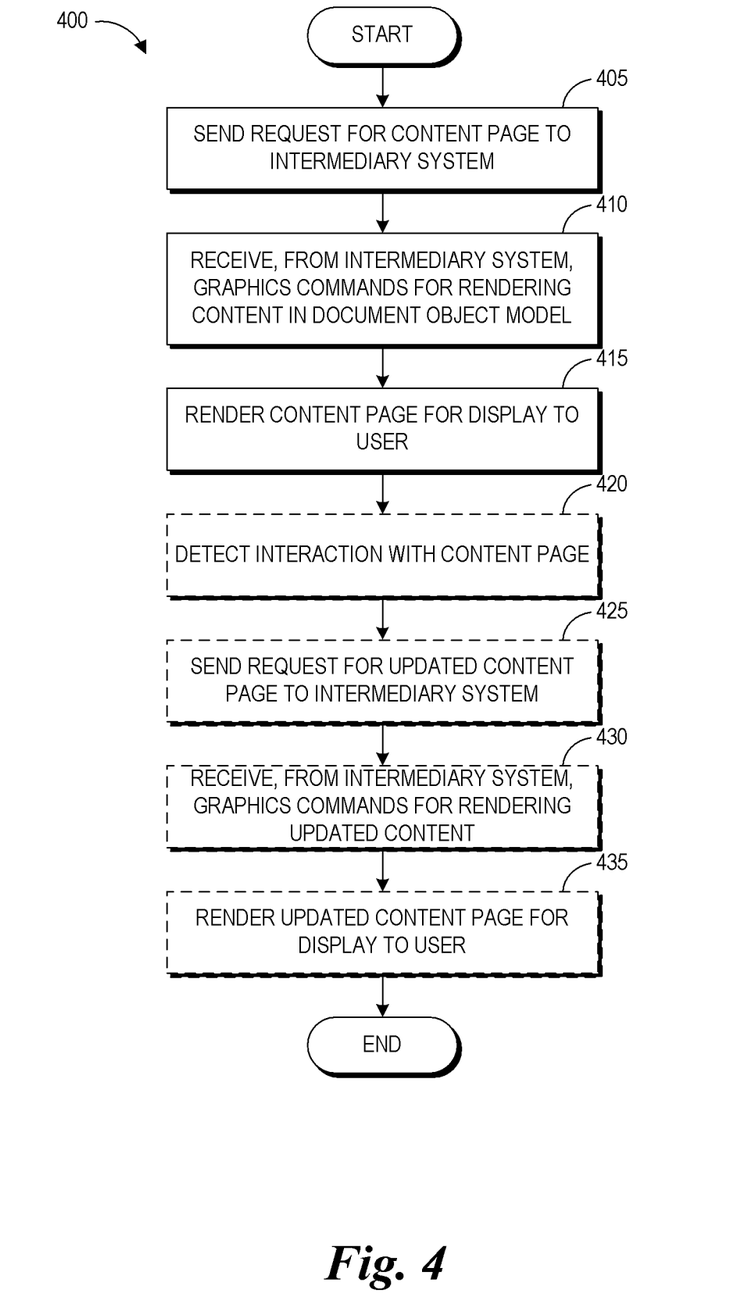
FIG. 4 illustrates an embodiment of a command interception rendering technique as implemented by a user device.

FIG. 4 illustrates an embodiment of a command interception rendering process 400 as implemented by a user device. For purposes of illustration, the process 400 is discussed herein as implemented by the browser 120 and other components of the user device 102 of FIGS. 1 and 2, however other client devices can implement the process 400 in other embodiments.

At block 405, the browser 120 sends a request for a content page to an intermediary system. As discussed above, the intermediary system can include a headless browser 140 to communicate with the content page host service and perform some of the graphics rendering for generating a visual representation of the content page for the user.

At block 410, the user device 102 receives, from the intermediary system, graphics commands for rendering content in a DOM representation of the requested content page. The graphics commands can include, for instance, OpenGL commands and bitmaps of image data. In some embodiments, the browser 120 can receive the graphics commands. In other embodiments, the graphics commands can be received by the GPU of the device 102.

At block 415, the user device 102 can use the received graphics commands to generate a visual representation of the content page for display to the user. The graphics commands can be used to determine how to display the pixels or voxels of a display associated with the device 102 in order to present the visual representation of the content page.

Process 400 also includes optional blocks 420-435 for handling interactivity of the page, for example providing an updated visual representation of the content page based on user interaction with the page. In some embodiments, a content page may have no interactive features, and accordingly blocks 420-435 can be omitted from the process 400. In some embodiments, a content page may have interactive features but a user may not interact with any of the interactive features, and accordingly blocks 420-435 can be omitted from the process 400.

At optional block 420, the browser 120 can receive an indication of user interaction with the content page. For example, the user may interact with the page through an input device built in to user device 102 or connected to device 102, for example a mouse, joystick, track pad, touch screen, touch panel, scroll wheel, keypad, button, microphone and voice command recognition module, camera and gesture recognition module, or other input element. The user interaction may include selection of user-selectable options, scrolling, zooming, touch input, cursor clicks, or text input, to name a few.

At block 425 the browser 120 sends a request for updated instructions to the intermediary system. In some embodiments, browser 120 may first determine whether the provided graphics instructions enable browser 120 to handle the updates based on the interaction locally. If the graphics instructions enable browser 120 to handle the updates, then browser 120 may generate an updated visual representation of the content page. If the graphics instructions enable browser 120 to handle the updates, then browser 120 sends a request for updated instructions to the intermediary system.

At block 430, the browser 120 receives graphics commands for rendering the updated content from the headless browser 140. The graphics commands can correspond to only the portion of the content page that is changed by the update in some embodiments.

At block 435 the browser 120 can perform the updated rendering based on the updated graphics instructions.

Example User Interface

Figure 5:
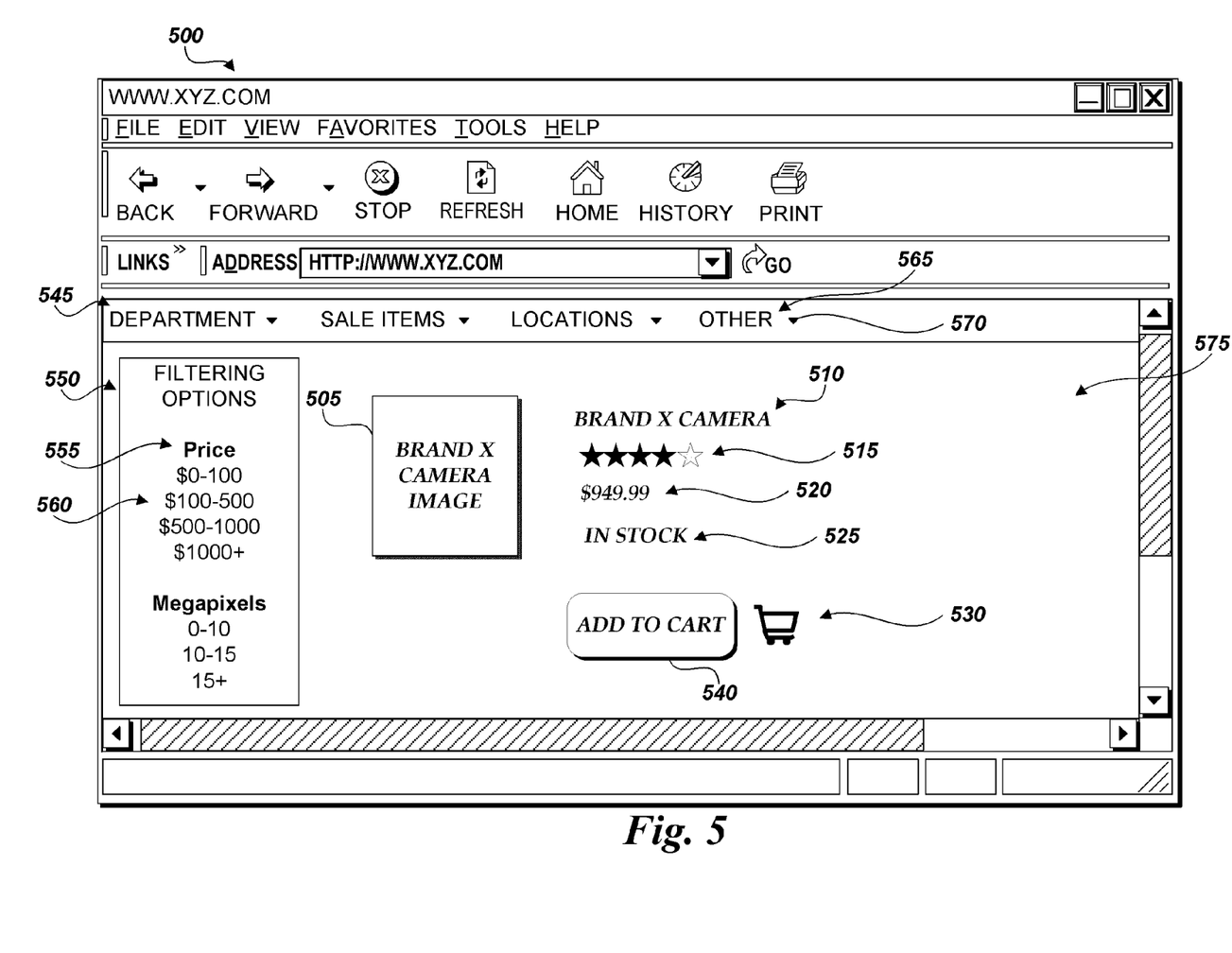
FIG. 5 illustrates an example of a content page that can be rendered using the command interception rendering techniques described herein.

FIG. 5 illustrates an example of a user interface 500 (e.g., web page) including a visual representation of a content page rendered using the command interception rendering techniques described herein. The visual representation of the content page includes a main content portion 575, a left menu portion 550, and an upper menu portion 545.

The graphics commands can include instructions to draw the objects for each of these portions 575, 550, 545 to a separate canvas. The main content portion 575 includes an item image 505, a graphical button 540 with a user selectable option to add to cart, a graphical cart icon 530, star rating icons 515, and several text strings 510, 520, 525. In one example, some of these elements can be drawn using bitmaps. For instance, the intermediary system can bundle a bitmap for displaying the item image 505 together with OpenGL commands regarding where to display the bitmap. Execution of these OpenGL commands by the user device can upload the bitmap data to the GPU of the user device and then display the image 505 in the correct location. Similar commands can be used to draw the graphical cart icon 530, text strings 510, 520, 525, and star rating icons 515 in some embodiments. In other embodiments, vector graphics commands can be used to draw the graphical cart icon 530, star rating icons 515, and the background rectangle for graphical button 540. Graphics commands for drawing text strings 510, 520, 525 can include instructions to upload a texture to the GPU that contains all the character glyphs for a certain font, then instructions to run a number of OpenGL commands to selectively place a bitmap for each character in the right locations. In some embodiments, interactivity instructions for handling user interaction with the user-selectable add to cart option associated with the graphical button 540 can include an area associated with the interaction (for example, the area of the background rectangle of the button 540) and a type of action or event associated with user input in the area.

The left menu portion 550 includes text 555 and user-selectable options 560. In one example, the OpenGL commands used to draw left menu portion 550 can instruct the user device to first draw the background rectangle and then draw the text 555 over the rectangle. For instance, a sequence of OpenGL commands such as the following can be used to draw the rectangle:

```
GLfloat rectVertices[ ]={
  −0.5f, −0.5f,
  0.0f, −0.5f,
  0.0f, 0.5f,
  −0.5f, 0.5f
};
glEnableClientState(GL_VERTEX_ARRAY);
glColor3f(1.0f, 1.0f, 1.0f);
glVertexPointer(2, GL_FLOAT, 0, rect);
glDrawArrays(GL_TRIANGLE_FAN, 0, 4);
```

Instructions to draw the text 555 can include instructions to upload a texture to the GPU that contains all the character glyphs for a certain font, then instructions to run a number of OpenGL commands to selectively place a bitmap for each character in the right locations within the rectangular box of left menu portion 550. In some embodiments, interactivity instructions for handling user interaction with the user-selectable options 560 can include an area associated with each user-selectable option 560 and a type of action or event associated with user input in the area.

The upper menu portion 545 also includes text 565 and user-selectable options 570. Instructions to draw the text 565 can include instructions to upload a texture to the GPU that contains all the character glyphs for a certain font, then instructions to run a number of OpenGL commands to selectively place a bitmap for each character in the right locations within the upper menu portion 545. Interactivity instructions for handling user interaction with the user-selectable options 570 can include an area associated with each user-selectable option 570 and a type of action or event associated with user input in the area.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A distributed browsing system for providing access to network-accessible content, the system comprising:
   a browser component adapted to run on a user device that includes a graphics processing unit, said browser component configured to provide a user interface on a display of the user device; and
   an intermediary system separate from the user device and configured to:
      receive a request from the user device for a content page and to retrieve the content page from a host system, a graphics pipeline of the intermediary system comprising:
      a content processing module configured to generate a document object model representation of the content page, wherein the document object model representation includes data representing a plurality of layers of the content page,
      a graphics processing module configured to generate, based at least partly on the document object model representation, a stream of graphics commands for rendering a visual representation of the content page, the stream of graphics commands including graphics library commands operable to instruct the graphics processing unit associated with the browser component how to assemble the plurality of layers of the content page, based on the data representing the plurality of layers in the document object model representation, to draw at least one graphical component of the visual representation of the content page,
   wherein the intermediary system is further configured to:
      intercept the stream of graphics commands including the graphics library commands from the graphics pipeline, and
      send the intercepted stream of graphics commands including the graphics library commands to the user device over a communication network;
   wherein the browser component is configured to render the plurality of layers of the content page on the display of the user device at least partly by providing the intercepted stream of graphics commands to the graphics processing unit of the user device.

2. The system of claim 1, wherein the intermediary system is configured to execute a first portion of the graphics commands and to transmit a second portion of the graphics commands to the user device for execution.

3. The system of claim 1, wherein the intermediary system is configured to assess, for a given set of the graphics commands, whether execution of the set of graphics commands on the user device will provide a performance benefit relative to execution of the set of graphics commands on the intermediary system.

4. The system of claim 3, wherein the assessment is based on one or more factors including whether execution of the set of graphics commands on the user device will reduce a perceived page load time relative to the at least one alternative content delivery technique, reduce an amount of processing time for rendering the content page, increase a level of interactivity of the content page, or decrease battery usage of the user device.

5. The system of claim 1, wherein the intermediary system is configured to pre-render a portion of the page and to transmit a graphical representation of the portion to the user device.

6. The system of claim 1, wherein the intermediary system implements a headless browser.

7. The system of claim 1, wherein the stream of graphics commands instruct the browser component to draw objects of different layers of the plurality of layers of the document object model to separate canvases.

8. A method of providing access to network-accessible content via an intermediary system, the method comprising:
   receiving, at the intermediary system from a browser component adapted to run on a user device separate from the intermediary system, a request for a content page;
   retrieving the content page from a host system;
   generating a document object model representation of the content page, wherein the document object model representation includes data representing a plurality of layers of the content page;
   generating, based at least partly on the document object model representation, a stream of graphics commands for rendering a visual representation of the content page, the stream of graphics commands including graphics library commands operable to instruct a graphics processing unit associated with the browser component how to assemble the plurality of layers of the content page, based on the data representing the plurality of layers in the document object model representation, to draw at least one graphical component of the visual representation of the content page;
   intercepting the stream of graphics commands including the graphics library commands from the intermediary system; and
   providing, via a communications network, the intercepted stream of graphics commands including the graphics library commands to the browser component for rendering the visual representation of the plurality of layers of the content page on a display associated with the user device.

9. The method of claim 8, further comprising assessing, via the intermediary system for a given set of the graphics commands, whether execution of the set of graphics commands on the user device is preferable compared to at least one alternative content delivery technique.

10. The method of claim 9, further comprising sending the set of graphics commands to the user device for execution on the user device if execution of the set of graphics commands on the user device is preferable.

11. The method of claim 9, further comprising:
   pre-rendering, via the intermediary system, a portion of the content page corresponding to the set of graphics commands and transmitting a graphical representation of the portion to the user device if execution of the set of graphics commands on the user device is not preferable.

12. The method of claim 8, further comprising receiving, from the browser component, an indication of interaction with the visual representation of the content page rendered on the display by a user of the user device.

13. The method of claim 12, further comprising generating, via the intermediary system, a stream of updated graphics commands for rendering an updated visual representation of the content page, wherein generating the stream of updated graphics commands is based at least partly on the indication of interaction.

14. The method of claim 8, further comprising detecting, via the browser component, an indication of interaction with the visual representation of the content page rendered on the display by a user of the user device.

15. The method of claim 14, further comprising rendering, via the browser component, an updated visual representation of the content page based at least partly on the indication of interaction.

16. A non-transitory computer-readable medium storing computer executable instructions that, when executed by one or more computing devices, configure the one or more computing devices to perform operations comprising:
sending via a communication network, from a first browser component adapted to run on a user device to a second browser component adapted to run on an intermediary system separate from the user device, a request for a content page;
receiving via the communication network, by the first browser component, an intercepted stream of graphics commands generated by the second browser component adapted to run on the intermediary system, the intercepted stream of graphics commands including pre-rendering graphics library commands operable to instruct a graphics processing unit associated with the first browser component how to assemble a plurality of layers of the content page, based on data representing the plurality of layers in a document object model representation of the content page, to draw at least one graphical component for rendering a visual representation of the content page, wherein the stream of graphics commands is generated based at least partly on the document object model representation of the content page and intercepted from the intermediary system;
generating, via the first browser component and based on the intercepted stream of graphics commands, instructions to configure a display associated with the user device to display the visual representation of the content page; and
rendering the visual representation of the plurality of layers of the content page on the display of the user device.

17. The non-transitory computer-readable medium of claim 16, the operations further comprising assessing whether execution of the set of graphics commands on the user device is preferable compared to at least one alternative content delivery technique.

18. The non-transitory computer-readable medium of claim 17, the operations further comprising receiving, via the second browser component, a pre-rendering portion of the page corresponding to the set of graphics commands if execution of the set of graphics commands on the user device is not preferable.

19. The non-transitory computer-readable medium of claim 16, the operations further comprising receiving, at the first browser component, an indication of interaction with the visual representation of the content page rendered on the display by a user of the user device and sending the indication of interaction to the second browser component.

20. The non-transitory computer-readable medium of claim 19, the operations further comprising receiving, from the second browser component, a stream of updated graphics commands for rendering an updated visual representation of the content page based at least partly on the indication of interaction.

21. The non-transitory computer-readable medium of claim 16, wherein the intercepted stream of graphics commands instruct the first browser component to draw objects of different layers of the plurality of layers of the document object model to separate canvases.

* * * * *